Oct. 9, 1956　　　C. C. RIEMENSCHNEIDER　　　2,765,928
MERCHANDISE HANDLING AND STORING EQUIPMENT
Filed Oct. 18, 1950　　　　　　　　　　　　2 Sheets-Sheet 1
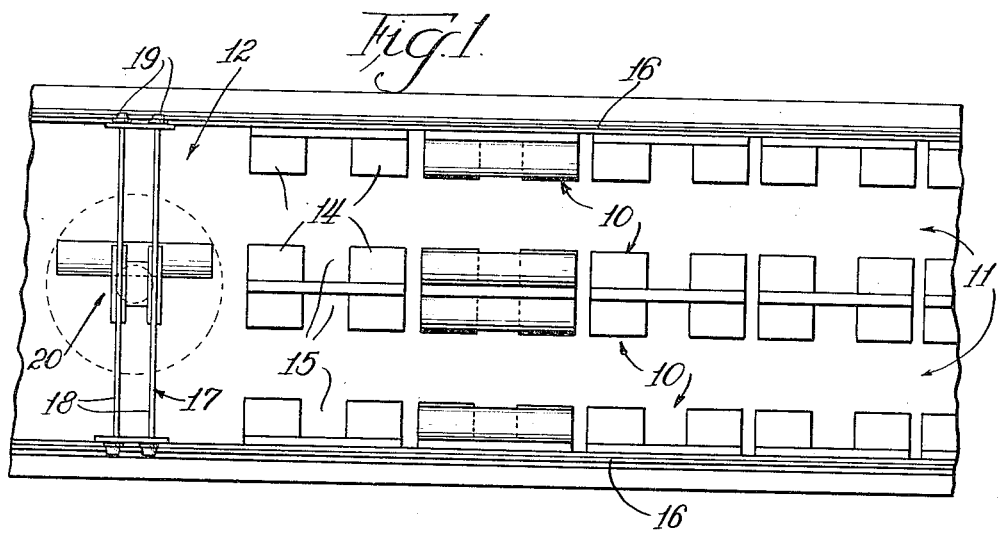
Fig. 1
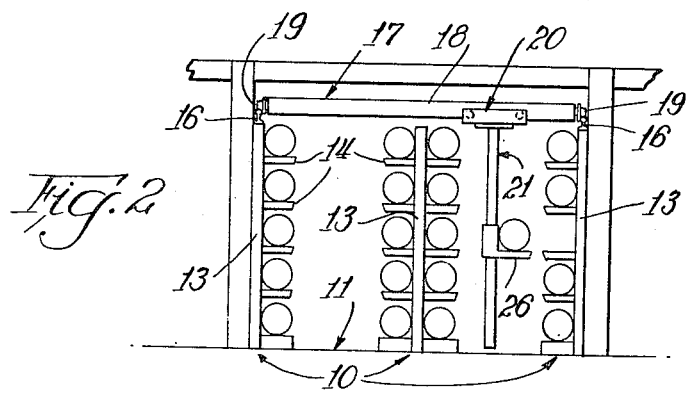
Fig. 2
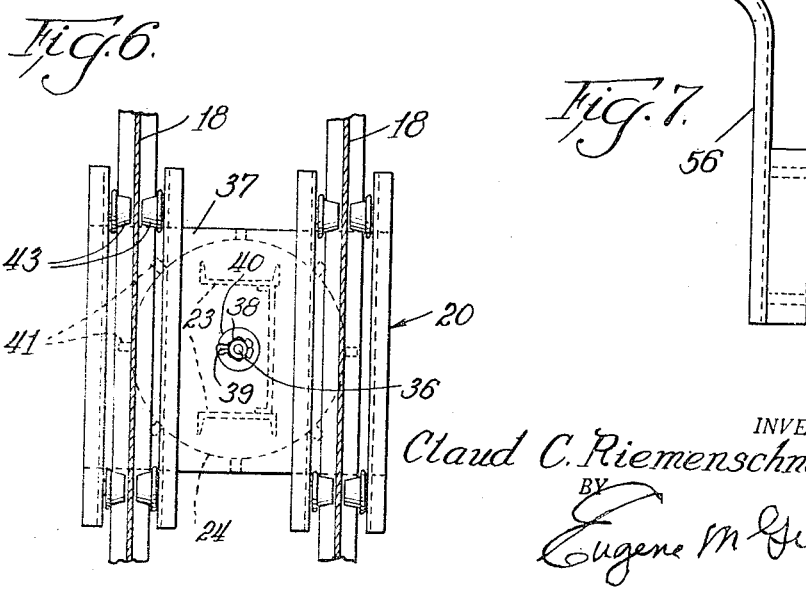
Fig. 6.
Fig. 7.
INVENTOR.
Claud C. Riemenschneider
BY
Eugene M. Giles
Atty.

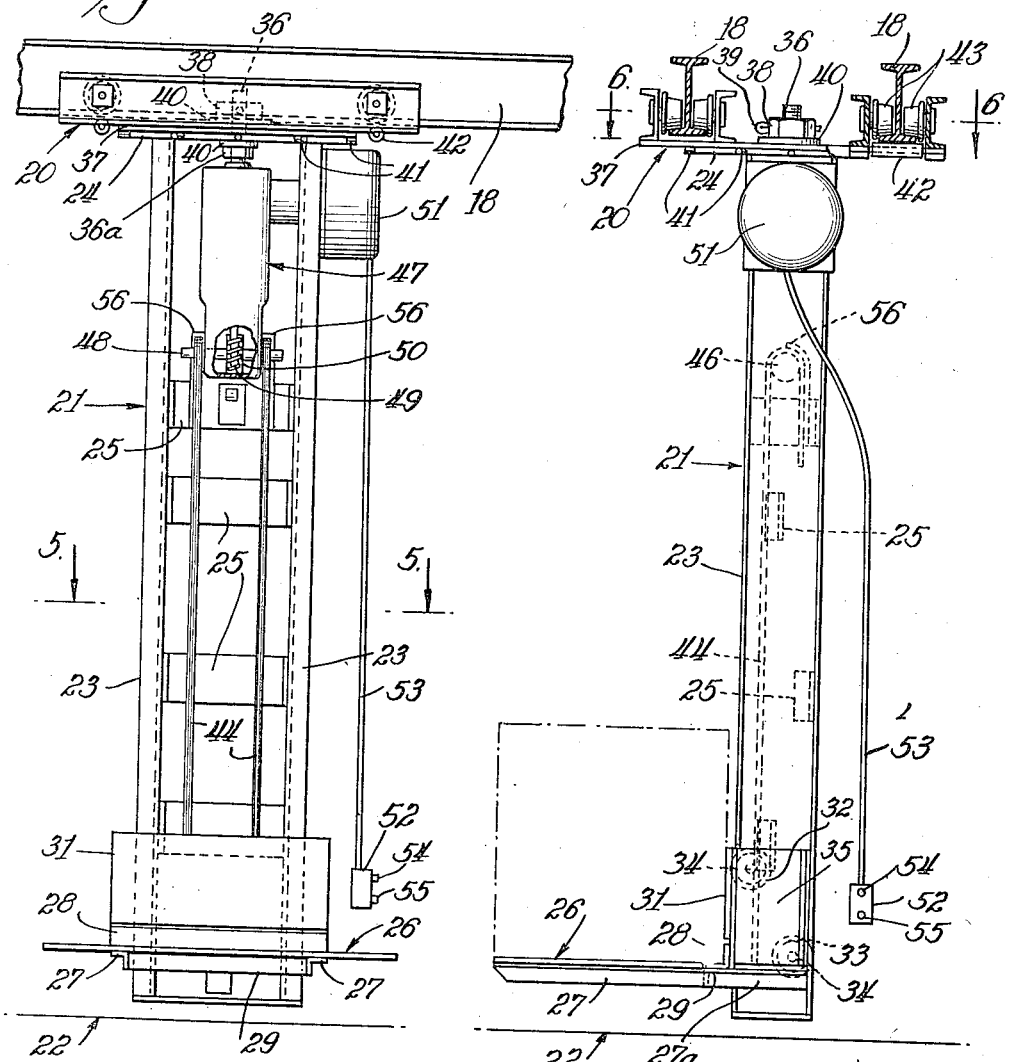

United States Patent Office 2,765,928
Patented Oct. 9, 1956

2,765,928
MERCHANDISE HANDLING AND STORING EQUIPMENT

Claud C. Riemenschneider, Western Springs, Ill.

Application October 18, 1950, Serial No. 190,800

3 Claims. (Cl. 212—135)

My invention relates to equipment for handling and storing heavy bulky articles, such for example as rolls of carpeting or the like, and has reference more particularly to an assemblage of storage racks or shelves with a carrier of fork lift type for handling the articles and loading and removal thereof on and from the racks or shelves, and wherein the carrier equipment is combined with the racks or shelves so as to constitute a unitary assembly which is complete in and of itself and installed in a building by merely setting up the racks or shelves on the floor and placing the carrier equipment thereon.

The principal objects of my invention are to simplify and improve handling and storing equipment of the type to which this invention relates; to simplify and facilitate the installation of such equipment in a building; to mount the carrier on the rack or shelf structure, or portions thereof, so that the assembly is a complete unit in and of itself; and to provide an improved carrier structure for cooperation with the racks or shelves, these and other objects being accomplished as hereinafter described, reference being had to the accompanying drawings in which:

Fig. 1 is a plan view showing a preferred arrangement of storage racks, overhead tracks, and service area in accordance with my invention;

Fig. 2 is a view looking at the left hand end of the facilities of Fig. 1, but showing the carrier in one of the aisles between the storage racks;

Fig. 3 is a front view of the hoist and carrier unit which forms a part of my invention;

Fig. 4 is a side view of the hoist and carrier unit shown in Fig. 3;

Fig. 5 is a sectional view on the line 5—5 of Fig. 3;

Fig. 6 is a sectional view on the line 6—6 of Fig. 4; and

Fig. 7 is a detailed view of the chain guard of the hoist and carrier unit of Figs. 3 and 4.

Referring now to the drawing, Fig. 1 represents a more or less typical arrangement of racks 10 as employed in connection with my invention, said racks 10 being arranged in parallel rows with aisles 11 therebetween, said aisles 11 leading to a service area 12.

The marginal rows of racks 10 consist of vertical supports 13 with vertically spaced cantilever shelves 14 secured thereto and projecting outwardly therefrom toward the aisles 11. One or more intermediate rows of racks 10 are made up of similar vertical supports 13 with outwardly projecting shelves 14 at both sides thereof. Thus each aisle 11 has a row of racks 10 at each side thereof. The shelves 14 are not continuous, lengthwise, but consist of spaced projecting planar supports with gaps 15 therebetween.

Along the opposite sides of the storage area in which the rows of racks 10 are disposed, parallel overhead tracks 16 are provided, said tracks comprising continuous rails 16 supported along each side of the storage area on the marginal vertical supports 13 of the two outer rows of racks 10. Said tracks 16 extend the full length of the rows of racks 10 and are continued beyond the storage area along opposite sides of the service area 12, as shown in Fig. 1, the outer ends thereof being supported by vertical supports 13 to which no shelves are attached.

A traveling crane 17 is mounted on the tracks 16 and is adapted to operate lengthwise thereon, said crane 17 comprising two parallel I-beams 18 extending laterally between the respective rails 16 and being provided at each end with a pair of flanged wheels 19. The wheels 19 are supported by the tracks 16 and roll thereon as the crane 17 is moved over the rows of racks 10 and the service area 12.

The parallel I-beams 18 serve as tracks for a trolley 20 which is movable thereon from one end of said I-beams 18 to the other, and said trolley 20 supports a hoist 21, which extends vertically downward therefrom and is of such length that it reaches almost to the floor 22, leaving sufficient clearance, however, to permit free movement thereof through the aisles 11 and throughout the service area 12.

The hoist 21 comprises a mast composed of a pair of spaced parallel channel irons 23 secured at their upper ends to a circular plate 24 by welding or other secure fastening means. The channel sides of said channel irons 23 face outwardly, as shown in Fig. 5, and the said channel irons 23 are maintained in spaced apart relation by cross members 25 secured therebetween at selected intervals by means of welding or the like.

A laterally extending platform 26 of substantially the same depth as the shelves 14 is mounted to move vertically on the mast 23—23 and is supported on a pair of angle irons 27 which are secured together directly in front of the mast 23—23 by the angle irons 28 and 29 and extend rearwardly therefrom at opposite sides respectively of the mast, as indicated at 27a.

Each rearward extension 27a has a short channel section 30 secured thereto and extending upwardly therefrom along the outer side of the respective channel iron 23 of the mast and each channel section 30 is secured along the front thereof to a plate 31 which extends across the front of the mast 23—23 above the angle iron 28 and serves not only to brace the channel sections 30 but also to provide a back stop for the platform 26.

Each channel section 30 extends along the outer side of a channel iron 23 of the mast and has a pair of flanged wheels 32 and 33 mounted thereon at the inner side to roll respectively along the front and rear flanges of the respective channel irons 23 of the mast, the front wheels 32 being located near the upper ends of the channel sections 30 and the rear wheels 33 near the lower ends thereof so as to hold the platform in horizontal position.

Each wheel 32 and 33 is mounted on a pin or stud 34 which is secured to the respective channel section 30 and preferably also to a reinforcing plate 35 at the outer side of the channel section for greater security.

The mast 23—23 is rotatably secured at its upper end to the trolley 20 by means of a bolt 36 which is engaged through the circular plate 24 and projects through the bottom plate 37 of the trolley 20, the upper end of said bolt 36 being threaded and engaged by a nut 38 which is safetied thereto by means of a cotter key 39. Washers 40 are interposed between the circular plate 24 and the head 36a of the bolt 36 on the one hand and the nut 38 and the trolley bottom plate 37 on the other.

The hoist 21 is retained in substantially perpendicular relationship with the trolley 20 throughout rotation of said hoist 21 by means of radial rollers 41 which are secured at spaced intervals around the edge of the circular plate 24. The rollers 41 bear against the bottom plate 37 of the trolley 20 and prevent tilting the circular plate 24 with respect to the bottom plate 37 and hence prevent displacing the hoist 21 which is secured to said circular plate 24.

The trolley 20 is prevented from rocking on the I-beams 18 by means of tubular rollers 42 which are mounted below each pair of flanged track wheels 43 of the trolley.

The platform 26 is raised and lowered by means of a pair of chains 44 each of which is secured at one of its ends to a projection 45 on the back plate 31 of the platform 26, or on the back of the angle iron 28. The chains 44 extend upwardly between the channel irons 23 of the hoist 21 and pass over sprockets 46 at the opposite sides of a gear head 47 which said gear head 47 is mounted between the channel irons 23 of the hoist 21 and near the top thereof on the uppermost cross-member 25. This gear head 47 has a shaft 48 extending therethrough to which the sprockets 46 are secured and said gear head contains a worm 49 and worm gear drive 50 through which the shaft 48 is operated by a reversible electric motor 51. This motor is remote controlled by a switch 52 at the lower end of a flexible cord 53 attached to said motor 51 and suspended therefrom along side the hoist 21. The switch 52 is provided with an "up" button 54 and a "down" button 55, as shown in Fig. 4, which said buttons serve to control the operation of the motor and the direction of rotation thereof and hence the upward or downward movement of the chains 44 to which the platform 26 is secured. In order to insure against displacement of the chains 44 on the sprockets 46, a guard 56 is provided for each sprocket 46 at the side thereof where the chain is slack. Thus the platform 26 may be raised by pressing the "up" button 54 which causes the motor 51 to drive the sprockets 46 through the reduction gears in the gear head 47 in a direction to lift the platform 26. When the operation of the motor 51 is reversed, by pressing the "down" button 55, the platform 26 descends. The operation of the motor 51 ceases when pressure on either button is released and the chains 44 are held firmly against movement in either direction by the worm 49 and worm gear 50 drive.

It will be understood that the platform 26 can be raised and lowered as desired from near the floor to near the top of the hoist 21 by manipulating the "up" and "down" buttons 54 and 55. The platform 26 can be turned manually in any direction by virtue of the pivotal mounting of the hoist 21 on the trolley 20. The platform 26 can be moved laterally to register with the shelves 14 at opposite sides of the aisles by pushing the hoist 21 and causing the trolley 20 to ride one way or the other on the traveling crane 17, and said platform 20 can be moved lengthwise of the storage area by pushing in the desired direction on the hoist 21, thus causing the traveling crane 17 to move in such direction on the overhead tracks 16. The platform 26 is of such length that it is operable in the gaps 15 between the shelf sections and thus may be operated to lift rolls of carpeting from the shelves and to deposit same thereon.

Thus, in handling elongated merchandise such as a carpet roll, for example, an operator would place the roll on the platform 26 so that the approximate weight center of the roll is on the platform 26 and the ends of the roll protrude a substantially equal distance at each side of the side platform 26.

The trolley 20 is then moved laterally by pushing the hoist 21 to bring the hoist into alignment with the particular aisle 11 in which the roll is to be stored and said hoist 21 is turned so that the platform 26 faces that side of the aisle where the shelf 14 is located on which the roll is to be placed. The roll is then in lengthwise relation with respect to the aisle 11 and will pass readily between the rows of racks 10.

The operator then pushes the hoist 21 and the roll thereon down the aisle 11 in the direction of the shelf 14 on which the roll is to be placed, and stops the hoist and its supported roll in front of the gap 15 between the shelves 14 on which the roll is to be stored. The operator then presses the appropriate "up" or "down" button 54 or 55 until the platform 26 is slightly higher than the selected shelves 14. He then pushes the hoist 21 laterally causing the trolley 20 to move in the desired direction just far enough to locate the roll in the position over the shelves 14 on which he wishes to deposit such roll. He then presses the "down" button 55 to lower the platform 26 just below the level of the selected shelves 14, thus depositing the roll thereon and leaving the platform 26 free to be moved back into the aisle 11.

When a roll is to be picked up and moved, the foregoing procedure is reversed, by bringing the platform 26 in under the middle of the selected roll, raising said platform 26 to lift the roll off the shelves 14, moving it out into the aisle 11 and then out to the service area 12 where the roll may be turned around for storage in another aisle, or removed from the platform 26 for cutting or the like in the service area 12. It may be unrolled, a portion cut therefrom, rolled up again, and returned to its place in the racks 10.

The load supporting members on the racks 10 may be shelves 14 as shown and described herein or any other convenient type of supports. Moreover, the shelves 14 may be removably supported to be lifted and transported with the load thereon if desired, or carpet rolls may be mounted as in my application Serial No. 652,043, filed October 27, 1945, now Patent No. 2,601,560, and lifted and transported with the roll supporting spiral.

It will be understood, therefore, that while I have shown and described my invention in a preferred form, various changes and modifications may be made therein without departing from the spirit of my invention, the scope of which is to be determined by the appended claims.

What is claimed is:

1. A hoisting device of the class described comprising a carriage supported by and movable along elevated tracks and having a mast which extends vertically downward from the carriage and is pivoted thereto at its upper end to rotate about a vertical axis, and a lifter which is movable vertically along the mast and projects outwardly from the front thereof, the said mast comprising two laterally spaced uprights which serve as guides along which the lifter is vertically movable and between the upper ends of which a gear case is mounted which contains gearing by which the lifter is vertically movable along the mast, the said uprights having opposite crosswise extremities thereof lying respectively in the planes of the front and rear faces of the mast and the said gear case and gearing being located substantially entirely between said planes, and a motor by which the gearing of said gear case is operable and located substantially entirely between said planes, the said gear case being vertically elongated and having a shaft extending horizontally through the lower end thereof in the direction in which the uprights are spaced apart and the said shaft being rotatable by the motor through the gearing of the gear case, and the lifter having a pair of flexible members attached thereto and operatively connected with the shaft so that the lifter is moved vertically along the mast by rotation of the shaft.

2. A hoisting device of the class described comprising a carriage supported by and movable along elevated tracks and having a mast which extends vertically downward from the carriage and is pivoted thereto at its upper end to rotate about a vertical axis, and a lifter which is movable vertically along the mast and projects outwardly from the front thereof, the said mast comprising two laterally spaced uprights which serve as guides along which the lifter is vertically movable and between the upper ends of which a gear case is mounted which contains gearing by which the lifter is vertically movable along the mast, the said uprights having opposite crosswise extremities thereof lying respectively in the planes of the front and rear faces of the mast and the said gear case and gearing being located substantially entirely between said planes, and a motor by which the gearing of said gear case is operable and located substantially entirely between said planes, the said gear case having a shaft extending therethrough and rotatable by the motor through the gearing of the gear case and the shaft having two sprockets thereon with chains trained thereover and operatively interengaged therewith and each chain having one end thereof secured to the lifter and the other end thereof free and depending loosely from the sprocket and each sprocket having a guard extending at least part way along the periphery of the upper half thereof and holding the chain operatively interengaged with the sprocket.

3. A hoisting device of the class described comprising a carriage supported by and movable along elevated tracks and having a mast which extends vertically downward from the carriage and is pivoted thereto at its upper end to rotate about a vertical axis, and a lifter which is movable vertically along the mast and projects outwardly from the front thereof, the said mast comprising two laterally spaced uprights which serve as guides along which the lifter is vertically movable and between the upper ends of which a gear case is mounted which contains gearing by which the lifter is vertically movable along the mast, the said uprights having opposite crosswise extremities thereof lying respectively in the planes of the front and rear faces of the mast and the said gear case and gearing being located substantially entirely between said planes, and a motor by which the gearing of said gear case is operable and located substantially entirely between said planes and outside of said uprights, said motor having connections to one end of said gear case, the said gear case being vertically elongated and having a shaft extending horizontally through the other end thereof in the direction in which the uprights are spaced apart and the said shaft being rotatable by the motor through the gearing of the gear case, and the lifter having a pair of flexible members attached thereto and operatively connected with the shaft so that the lifter is moved vertically along the mast by rotation of the shaft.

References Cited in the file of this patent

UNITED STATES PATENTS

| | | |
|---|---|---|
| 662,089 | Pettey | Nov. 20, 1900 |
| 675,861 | Marquart | June 4, 1901 |
| 744,316 | Eitle | Nov. 17, 1903 |
| 951,304 | Clark et al. | Mar. 8, 1910 |
| 1,522,600 | Strickland | Jan. 13, 1925 |
| 1,699,544 | Rohlfing | Jan. 22, 1929 |
| 1,757,331 | Porter | May 6, 1930 |
| 1,840,327 | Paulsen | Jan. 12, 1932 |
| 1,905,748 | Redshaw | Apr. 25, 1933 |
| 1,927,677 | Bennington | Sept. 19, 1933 |
| 2,063,943 | Norbom | Dec. 15, 1936 |
| 2,320,600 | Howell | June 1, 1943 |
| 2,354,178 | Ulinski | July 18, 1944 |
| 2,521,324 | Ball | Sept. 5, 1950 |
| 2,535,961 | Schutt | Dec. 26, 1950 |
| 2,553,378 | Miller | May 15, 1951 |
| 2,624,470 | Geist | Jan. 6, 1953 |

FOREIGN PATENTS

| | | |
|---|---|---|
| 402,955 | France | Oct. 22, 1909 |